United States Patent [19]

Merz et al.

[11] Patent Number: 5,894,071
[45] Date of Patent: Apr. 13, 1999

[54] TWO-COMPONENT ADHESIVE-, SEALING- OR COATING COMPOSITION AND IT'S USE

[75] Inventors: Peter Merz, Wollerau, Switzerland; Norman E. Blank, Wayne, N.J.; Hans-Peter Tschan, Waltenschwil, Switzerland; Reinhard Ernst Wappmann, Wettingen, Switzerland; Lutz Zabel, Birmensdorf, Switzerland

[73] Assignee: Sika AG, vorm. Kaspar Winkler & Co., Switzerland

[21] Appl. No.: 08/761,814

[22] Filed: Dec. 6, 1996

Related U.S. Application Data

[63] Continuation of application No. 08/422,162, Apr. 14, 1995, abandoned.

[30] Foreign Application Priority Data

Apr. 15, 1994 [CH] Switzerland .................. 1145/94

[51] Int. Cl.⁶ .................. C08J 3/00; C08K 3/20; C08L 75/00; C08L 83/00
[52] U.S. Cl. .................. 524/591; 523/400; 523/404; 523/415; 523/416; 524/542; 524/588; 524/589; 524/590; 524/597; 524/837; 524/838; 524/872; 524/874; 524/839; 524/840; 525/398; 525/399; 525/403; 525/406; 525/452; 525/456; 525/457; 525/463; 528/27; 528/52; 528/73
[58] Field of Search .................. 524/588, 589, 524/590, 591, 839, 840, 542, 597, 837, 838, 872, 874; 528/44, 28, 27, 52, 73; 523/400, 404, 415, 416, 417, 425; 525/398, 399, 403, 406, 452, 456, 453, 457, 463, 464, 465, 476

[56] References Cited

U.S. PATENT DOCUMENTS

| | | | |
|---|---|---|---|
| 4,098,743 | 7/1978 | Scriven et al. | 524/840 |
| 4,367,313 | 1/1983 | Rizk et al. | 525/102 |
| 4,469,857 | 9/1984 | John | 528/59 |
| 4,687,533 | 8/1987 | Rizk et al. | 156/307.3 |
| 4,853,454 | 8/1989 | Merger et al. | 528/59 |
| 5,023,298 | 6/1991 | Miwa et al. | 525/103 |
| 5,194,488 | 3/1993 | Piestert et al. | 524/703 |
| 5,340,901 | 8/1994 | Wang | 528/60 |
| 5,389,718 | 2/1995 | Potter et al. | 524/591 |
| 5,389,720 | 2/1995 | Markuseh et al. | 524/839 |

FOREIGN PATENT DOCUMENTS

| | | |
|---|---|---|
| 153456 | 9/1985 | European Pat. Off. . |
| 158893 | 10/1985 | European Pat. Off. . |
| 404315 | 12/1990 | European Pat. Off. . |
| 1495559 | 7/1967 | France . |
| 3840220 | 5/1990 | Germany . |
| 4028704 | 3/1992 | Germany . |
| 1104831 | 2/1968 | United Kingdom . |

*Primary Examiner*—Patrick D. Niland
*Attorney, Agent, or Firm*—Burns, Doane, Swecker & Mathis, L.L.P.

[57] ABSTRACT

Two-component adhesive-, sealing- or coating compositions are being described which are separately packed, and comprise the component A and the component D, whereby the component A is curing as soon as it gets in touch with water or the component D which contains the curing agent for the component A.

The component D can be, or a component B containing an ingredient which is curing at the contact of water, or, possibly, at the contact with the component A, or the component D can also be a mixture of solid matter and a volatile ingredient which is causing the cross-linking of the component A.

The advantage of the novel two-component systems is that the component D is working as a curing agent for the component A, however, a surplus thereof is, or self-curing, or it does not leave a nuissance residue in the cured composition.

12 Claims, No Drawings

5,894,071

1

TWO-COMPONENT ADHESIVE-, SEALING- OR COATING COMPOSITION AND IT'S USE

This application is a continuation of application Ser. No. 08/422,162, filed Apr. 14, 1995 now abandoned.

A two-component adhesive-, sealing- or coating composition is being described which is storable, when separately packed and which is curing when both components are mixed.

BACKGROUND OF THE INVENTION

Two-component adhesive-, sealing- or coating compositions are already known for a long time. They consist of a separately packed resin component having reactive groups, e.g. epoxy groups, and a curing agent. Both components are mixed just before use and the mixture is applied immediatedly after (within the "period of exposure") onto the corresponding substrate where it is curing.

An essential drawback of these two-component systems is the fact that the mixing of both components is being carried out by the user and that an inaccurate mixing ratio of both components is leading to a deterioration of the strength of the cured adhesive-, sealing- or coating composition.

In case that the resin component contains reactive groups which are causing rapid curing at the contact with a curing agent, but are also slowly curing with water to completion, e.g. ambient moisture, then it is not crucial to operate with an inaccurate mixture having a deficiency of the curing agent, because a gradual curing to completion of the resin component is taking place anyway.

However, it is more critical, when during use more curing agent is added than necessary for curing to completion of the resin component. In this case the surplus of curing agent remains after complete curing of the resin component as a "foreign ingredient" within the mixture, thus, causing a dramatic deterioration of the mechanic properties of the cured composition. Corresponding compositions that are displaying very good mechanic properties when the mixing ratio of the resin component and the curing agent, issued by the producer, is being well respected, show completely unsatisfactory values, in the case that the user is adding bigger quantities of curing agent during the preparation of the mixture than necessary for complete curing.

Furthermore, it is important for known two-component adhesive-, sealing- or coating compositions that a uniform and homogeneous mixing of the resin component with the curing agent is being carried out for use, because otherwise the cured adhesive-, sealing- or coating composition also has areas with a too high or too low content of curing agent, even if the correct mixing ratio of resin component and curing agent is being used which is leading to the problems already described concerning the diminution of mechanic properties of the cured composition.

From the above-mentioned reasons, in recent years one-component adhesive-, sealing- or coating-compositions have been more and more accepted. These one-component adhesive-, sealing- or coating compositions have a resin component with reactive groups which are curing through the effect of atmospheric moisture at ambient temperature, or these one-component compositions are containing an additional inactivated curing agent which is added homogeneously to the resin component by the manufacturer respecting the accurate mixing ratio. The corresponding one-component products are storable at room temperature and are curing only when the adhesive area is being heated to the on-set temperature of the curing agent.

2

A heating of the adhesive area, however, is undesirable or even impossible in many applications, and therefore for these applications only the use of those one-component systems is possible that are exclusively curing after the application through the effect of water, for example by ambient atmospheric moisture.

These systems, however, have the drawback that long curing times are necessary for thorough curing and immediately after joining the substrates to be glued, the adhesion is that weak that a fixation of the parts to be glued is absolutely necessary. This is highly undesirable in many applications, for example in the manufacturing of motor vehicles, like automobiles, buses, shipbuilding as well as building commerce, e.g. home building, for example if the corresponding one-component adhesive-, sealing- or coating compositions are used to glue wind-shields or to glue home windows.

A further drawback is that the speed of the curing depends on the available atmospheric moisture and that with cold ambient temperatures and little atmospheric moisture it can take several weeks until complete curing is being achieved.

Since the curing is taking place from the exterior to the interior through the effect of atmospheric moisture, it is further dependent on the diffusion of the penetrating water in the adhesive layer and thick adhesive layers are curing extremely slowly, and, furthermore, also those adhesive layers are curing slowly that are linking large surfaces of substrates, because the interior areas of the surfaces that are to be glued impede strongly the penetration of humidity.

Due to these difficulties, known one-component adhesive-, sealing- or coating compositions for many applications and particular environmental conditions have been completely unsuitable so far and the two-component systems have to be used despite the above-mentioned drawbacks.

The subject of the present invention is to develop a two-component adhesive-, sealing- or coating composition in which both components are packed separately and which are storable, whereby when the components get in touch with each other, the mixing ratio between the resin component and the curing agent is not crucial because the resin component is curing also in the absence of curing agent through atmospheric moisture and because the curing agent is curing on its own to a solid composition due to the effect of atmospheric moisture, or because a possible surplus of the curing agent is steadily evaporating.

BACKGROUND ART

In the European patent application 0 404 315 a two-component polyurethane composition that is curing chemically is being described, in which part A) is comprising a prepolymer having terminal isocyanate groups and part B) is representing water or a water-containing composition, whereby part A) contains a molecular sieve as filling material which is free of water and loaded with a primary or a secondary amine with two or more functionalities (see claim 1).

The products described there are to be used as adhesive, sealant, coating- or moulding composition and particularly the frequent carbon dioxide blister formation caused by mixing isocyanates with water shall be avoided (see column 1, line 17–22 or 26–29 respectively).

Concerning the two-component polyurethane composition described therein, the molecular sieve loaded with the amine is, at the contact with water of the component B), setting free the amine having the effect of a curing agent, and thus, the curing of the prepolymer with the terminal isocyanate groups is taking place. A drawback of these two-component polyurethane compositions is, however, that the molecular sieve which is remaining in the composition after the release of the amine, has an ion exchanging effect throughout the entire life-time of the adhesive-, sealing- or coating composition and therefore the danger of importing alien ions from the environment in the cured composition throughout the entire period of use of the cured product which represents a danger of damaging the sealant itself or the substrate on which it was applied.

In the European Patent Application 153 456 a two-component composition on the basis of polyurethane which cures chemically, is being described, whereby the first component contains the reaction product of a prepolymer with isocyanate groups and a reactive compound containing molecular groups having two hydrogen atoms which have a different reactivity towards the isocyanate groups. This reactive component containing two hydrogen atoms could be a thioalcohol, e.g. the 2-mercapto ethanole. As could be seen from claim 11 and the specification, the prepolymer used as starting material, for the. synthesis of the second component, needs to have free isocyanate groups, but the compound having two different reactive hydrogen atoms has to be used in such an excess that the second component does not display any crosslinkable isocyanate groups, but rather the reactive hydrogen atoms necessary for cross-linking the first component. Also from the special informations of page 10. last paragraph, it can be seen that if only 0.8 equivalents of the compound having two reactive groups within the molecule are used per isocyanate group, a surplus, namely 1.6 moles of the reactive hydrogen atoms per mole of isocyanate group have to be present in the curing agent. Also from example 1, namely page 14, last but one paragraph, it can be seen that the reaction of the second component has to be carried out in a way that this product shows no more free isocyanate groups in the infra red spectrum.

Thus, the curing agent of the products described therein does not show any group that has the ability to cross-link through ambient atmospheric moisture if a surplus of the curing agent is being used.

In the U.S. Pat. No. 4,367,313, "one-pot" coating compositions that are curing with moisture, being two-component, are described, whereby the first of the components contains at least one isocyanate group and at least an alkoxysilane group that could be hydrolysed and the second component is a polymer which has a variety of oxazolidine groups. From column 6, lines 45 to 54 it can be seen, however, that the "one-pot" systems described there after mixing of the two components are remaining stable until the moisture is added which is then providing the hydroxy- or amino groups necessary for the curing from the second component through hydrolysis of the oxazolidine groups Thus, after the mixing of both components the storability of the mixture is quite low, however, the mixture behaves like a one-component coating composition which is curing through moisture, and the curing of this mixture is therefore taking place sufficiently fast only on those areas which get in touch with the atmospheric moisture. For this reason, the corresponding compositions do not show satisfactorily rapid curing by the application of thick layers of the mixture and they are therefore recommended only for the creation of relatively thin coatings, where the curing is guaranteed by the access of atmospheric moisture.

In the Japanese Patent Publication 4,001,222 (see abstract in DATABASE WPI Week 9207, Derwent Publications Ltd., London, GB; AN 92-053972), a composition that is curing in the cold is described which has to contain the following components:

A—an organic polymer with terminal methoxysilyl groups,
B—an epoxy resin,
C—a curing catalyst for epoxy and
D—a curing catalyst for the organic polymer with methoxysilyl groups, representing an organic tin compound.

This compound is packed in two components, whereby one component contains the polymer A with terminal methoxysilyl groups and the curing catalyst for epoxy, and the second component is a mixture of the epoxy resin B and the curing catalyst D.

If in this case both components are not homogeneously mixed, a steady and entire curing of the component containing the terminal methoxysilyl groups is taking place through the atmospheric moisture, however, the second component cannot be cured by atmospheric moisture alone, because epoxy resins cannot be cured with water alone and therefore in the absence of the curing catalyst for epoxy, these areas are remaining uncured. Thus, these two-component systems have with inaccurate mixing ratios the above mentioned drawbacks.

Furthermore, such two-component adhesive-, sealing- and coating compositions are already known, in which the resin component has reactive groups that are curing in the absence of the curing agent through atmospheric moisture, and in which the second component represents a mixture of a solid and a volatile curing agent, whereby as volatile curing agent, the possible surplus of which is evaporating steadily, preferably water is used.

In the British Patent Specification 1,104,831 a two-component sealant is already described, in which part A is a liquid prepolymer with up to 2.5% by weight of terminal isocyanate groups, and part B contains a well dispersed mineral filling material, particularly well dispersed silicic acid, as well as an inert diluent which has a low water content and contains a catalyst for the reaction of water and the isocyanate groups of part A. At the use of these two-component mixtures, about equal parts by weight of components A and B are mixed and additionally at least as much water is added such that all free isocyanate groups of part A are reacted with water.

A drawback of these two-component mixtures, in which one component having free isocyanate groups is mixed with a component containing a filling material and water, is the fact that during the reaction of the water with the isocyanate groups carbon dioxide is being split off in such an amount and at such a rate that blisters are formed throughout the curing composition.

According to the German Offenlegungsschrift 3,840,220 the solution of this problem has been tried in a way that in the component B the water is being used in an aggregated way, or chemically bound, or in the form of crystal water to inorganic oxides, hydroxides or other water-containing salts, or also in the form of water loaded molecular sieves, cellulose- or starch-derivatives, respectively, or organic polymers like polyamides In the U.S. Pat. No. 4,469,857 a two-component composition is being described, in which one component is a mixture of a component with free, isocyanate groups and a masked curing agent on the basis of an enamine and the second component contains water which is bonded to a carrier material, preferably in the form of a hydrate an an inorganic compound or as a hydrogel on the basis of silica containing compounds or polysaccarides.

Also in the German Offenlegungsschrift 4,028,704 and the corresponding U.S. Pat. No. 5,194,488 a two-component sealing composition is described, in which the component A contains a polyurethane with free isocyanate groups and a blocked curing agent that is being released through water, and the component B represents a water paste in which the water is reversibly bound on a carrier material, preferably on well dispersed cellulose, starch or cork powder. Preferably the component B consists of an inert viscous liquid, containing the water-loaded carrier material.

In all of the described two-component systems the component A contains additionally to the polymer with the free isocyanate groups a latent curing agent which at the contact with the water included in component B is deliberated and then reacts with the isocyanate groups However, it was found that the two-component systems of the latest developments in this area still show the problem of blister formation during the curing process, namely as soon as the water-containing component is mixed with the resin component containing the free isocyanate groups and the latent curing agent.

The object of the present invention was to develop two-component adhesive-, sealing- and coating compositions in which the resin component as well as the curing agent is capable to steadily cure to a solid composition at the exposure to atmospheric moisture, or in which the curing agent is volatile, with a possible surplus thereof evaporating steadily, whereby, however, in the embodiment, in which the resin component contains free isocyanate groups and in which the volatile curing agent of the second component is water, the problems traditionally coming up with regard to the formation of carbon dioxide blisters during the curing process are avoided through a special formulation.

DESCRIPTION OF THE INVENTION

One object of the present invention is therefore a two-component adhesive-, sealing- or coating-composition which is free of those solid components that have an ion exchanging effect, for example molecular sieves, whereby this composition is packed separately, comprising the component A and component D which are, separated from each other, storable, however, at a contact of the component A with this component D, a curing of the composition is taking place. This composition is characterised in that

- the component A contains at least one component that shows reactive groups leading to a cross-linking of the component A as soon as they get in touch with at least one ingredient of the component D and/or with water, and that
- the component D is, either a component B, or a component C, whereby
- the component B contains the ingredient that is causing the cross-linking of the component A and further contains an ingredient that has reactive groups that are leading to a cross-linking of component B as soon as they get in touch with water or possibly with an ingredient that is contained in component A, and
- the component C is a mixture which contains a solid and an ingredient causing the cross-linking of component A, whereby this ingredient is volatile, however, provided that if in the component A the reactive groups are isocyanate groups and the volatile ingredient of component C causing cross-linking of the component A is water, the solid of this component C is a water dilutable polymer having ionic groups, and that in this case the component A is free of curing agents or latent curing agents for the isocyanate groups of the component A.

The advantage of the two-component adhesive-, sealing- or coating compositions according to the invention consists in the fact that in comparison to traditional two-component systems, deviations from the optimal mixing ratios of component A with component D, or that with a non-homogeneous mixing of the component A with component D, respectively, no ingredients are remaining in the cured mass that are incapable to cure, thus, weakening the strength of the adhesion area.

As already mentioned, the component A must contain at least one ingredient having reactive groups that are leading to the cross-linking of the component A as soon as it gets in touch with at least one ingredient which is included in component D, and the cross-linking of the component A is also taking place it it gets in touch with water. Thus, a rapid curing of the component A takes place in those areas in which they get in touch with a sufficient quantity of the ingredient causing cross-linking of component A which is included in component D. In those areas of the component A in which the ingredient, contained in component D causing cross-linking of component A. Is not present in sufficient quantities, the steady curing of the component A is taking place anyway, because the ambient water, e.g. the atmospheric moisture completes the curing of the component A.

Thereby it is possible that the reactive groups that are included in the at least one ingredient of the component A are leading themselves to a cross-linking as soon as these groups get in touch with the ingredients included in component D, necessary for cross-linking, and/or the water. It is, however, possible that the reactive groups of the at least one ingredient of component A are incapable to cause the reaction of the cross-linking of the component A at the contact with water or the ingredient of the component D that is causing the curing of component A itself. In this case the component A must include a further ingredient, e.g. a latent curing agent which is being activated as soon as the component A gets in touch with the ingredient included in component D or with ambient water, respectively.

In both of the mentioned embodiments a rapid curing of the component A is brought on as soon as it gets in touch with a sufficient quantity of the corresponding ingredient which is included in the component D. However, a complete curing of component A is also being achieved through the effect of the ambient water.

In the case that in the two-component adhesive-, sealing- or coating compositions the component D is being formed by a component B, then the component B contains the ingredient causing cross-linking of component A, as well as at least one ingredient having reactive groups that are leading to a cross-linking of component B as soon as they get in touch with water or if necessary with an ingredient that is included in component A. In this case too, the component B can contain reactive groups that are leading themselves to a cross-linking of the component B as soon as they get in touch with water and, if necessary, with the additional ingredient possibly included in the component A which is bringing on cross-linking of these reactive groups of the component B. The reactive groups of the component B, however, cannot be able, if necessary, to bring about themselves a cross-linking reaction as soon as they get in touch with water. In this case, a latent curing agent needs to be additionally present in the component B that is being activated at the contact with water, e.g. that the curing agent is being liberated that is capable to a reaction of the reactive groups of the ingredients, thus leading to a cross-linking of the component B as soon as it gets in touch with the ambient water.

In the same way, an additional ingredient, possibly contained in component A which is leading to a curing of the reactive groups of the respective ingredient of the corresponding component B, must either directly cause the cross-linking of these groups, or component B must contain an additional ingredient, e.g. a specific compound that is leading to a curing of the component B as soon as it gets in touch with the additional ingredient of the component A. Thus, for example the component A can contain an ingredient which activates a latent curing agent included in component B, e.g. through liberation of the curing agent for the component B.

If the two-component adhesive-, sealing- or coating composition according to the invention is a such that is composed of a component A and a component C which is a mixture of a solid and the ingredient that is causing cross-linking of the component A, then this ingredient needs to be volatile. In this case too, the mixing of the component A with the component C is leading to a rapid cross-linking of the component A. If, however, the volatile ingredient causing the cross-linking of component A is not present in sufficient quantity, due to inaccurate mixing ratios or only in special areas of the mixture, complete curing of component A is taking place anyway through the ambient water. Since on the other side in this embodiment the ingredient included in the component C which is causing the cross-linking of the component A, must be volatile, a surplus of the component C does not entail a negative influence on the strength of the cured adhesive-, sealing- or coating composition, because this volatile ingredient is evaporating from the cured composition.

Typical examples for volatile ingredients included in component C which are causing the curing or the cross-linking, respectively, of the ingredient of component A that have the reactive groups are water or special volatile accelerators or curing agents like for example lower aliphatic alcohols, volatile primary, secondary or tertiary amines or ammonia.

Typical examples for solids included in the component C are polymer materials, inorganic or organic filling materials and pigments. For example, the component C can be a pasty composition which represents a mixture of a filling material or a pigment with water.

Two-component systems known so far, based on a component A which contains an ingredient with terminal isocyanate groups and a component C of water plus a solid, have, as already mentioned, always been leading to the problem of carbon dioxide blister formation during the curing process as soon as the component A was mixed with the component C. As already thoroughly illustrated before, in the systems used so far component A contained, additionally to the ingredient with the free isocyanate groups, in general a curing agent or a latent curing agent which was then setting off or accelerating the reaction of the water of the component C with the free isocyanate groups during the mixing process. In this kind of systems the problem of the carbon dioxide formation could also not be prevented if the water in component C was included in a way that it was difficult to liberate, e.g. bound as crystal water on an inorganic solid component C or bonded as moisture on hydroxyl groups of an organic solid based on polysaccarides, like starch or cellulose.

Surprisingly, it was now found that these known problems of carbon dioxide blister formation during the mixing of a component A that has free isocyanate groups with a component C that contains water and a solid, can be avoided through the following special conditions:

The component A in the embodiment in which the free reactive groups of component A represent isocyanate groups is free of a curing agent or a latent curing agent which is activated through the contact with the water of component C.

It can be presumed that through this missing of the curing agent, or latent curing agent, respectively, in component A, the reaction between the free isocyanate groups of component A and the water of component C is slowed down that much that the undesired separation of carbon dioxide under formation of blisters during the curing process is being avoided.

The second essential characteristic of the invention of this special embodiment of the two-component adhesive-, sealing- or coating composition, based on an ingredient containing isocyanate groups in the component A and a water paste C, is given through the special solid which in this case is included in the water paste. In this particular embodiment of the two-component adhesive-, sealing- or coating composition according to the invention, the solid of the water paste C is a water dilutable polymer that has ionic groups, e.g. a corresponding polyurethane, having carboxylic acid groups or sulfonic acid groups as ionic groups.

At the mixing of the component A with the water paste C, when using this special embodiment of the two-component system according to the invention, it has to be ensured that no complete homogeneous mixing of both components is taking place. Thus, it is probably being achieved that the spontaneous reaction of free isocyanate groups with water is taking place only on the surfaces of the dispersed particles of the water paste and proceeds steadily by diffusion during the curing process, beginning with these particles through the entire component A. However, a rapid curing of the entire mixture from component A and the component C is being achieved because the curing of the component A proceeds from numerous areas in the inhomogeneous mixture.

Preferably, the mixing ratios of the component A with the inventive component C in the two-component adhesive-, sealing- or coating compositions of the above mentioned embodiment are selected in a way that per mole of isocyanate groups in the component A half a mole of water through the component C is being introduced. On those areas, where through an inhomogeneous mixing, a surplus of water is being created, said surplus is diffusing steadily into the component A, or possibly remaining surpluses are steadily evaporating from the mixture of the components A and C, respectively. On the other side, a complete curing of component A is also being achieved on those areas, where a deficiency of the water paste C is existing in this inhomogeneous mixture, namely through the diffusion of water, or of the ambient atmospheric moisture, respectively.

With the embodiment of the two-component adhesive-, sealing- or coating compositions according to the invention which is composed of a component A having reactive groups and a component B having reactive groups, the component A and/or the component B can contain a specific compound, e.g. a catalyst which alone, in combination with ambient water, in combination with a curing agent, in combination with a latent curing agent and/or in combination with a further specific compound that is included in the other component, is leading to a cross-linking, or a self cross-linking, respectively, of the reactive groups of the ingredient of the other one of the two mentioned components A and B having these reactive groups. One of both components A or B can for example contain a tin compound and the other of both components an amine, whereby the tin compound reacts during the mixing with the amine to form a highly reactive urethane catalyst. Thus, the component A can for example contain isocyanate groups as reactive groups and furthermore, the tin catalyst and the component B can contain those reactive groups that could not be cross-linked through amines and, furthermore, the amine.

A corresponding procedure, namely a tin compound in the component A in combination with an amine of the second component, is also feasible within the possibility of component A plus component C, provided that in this case the component C represents a solid and a volatile amine.

According to a further preferred embodiment of the two-component adhesive-, sealing- or coating-compositions based on a cross-linkable component A and also a cross-linkable component B, the component A or the component B, respectively, contain reactive groups which could be isocyanate groups, inactivated isocyanate groups, silane groups, anhydride groups, or epoxy groups, combined with a curing agent that is activatable through water. Possibly a combination of two or more of such cross-linkable groups are present in the component A, or in the component B, respectively.

In the following, special possibilities are illustrated in which the reactive groups causing the cross-linking of the component A, or the reactive groups causing cross-linking of the component B, are selected from the mentioned reactive groups:

The component A contains an ingredient which has a free isocyanate group, whereby this ingredient is preferably a polyurethane with a terminal isocyanate group, linked to an aliphatic or aromatic rest, and the component B contains silane groups as reactive groups and, furthermore, a compound which provides the reactive hydrogen atoms which are causing at the contact of the component A with the component B the cross-linking of the component A through reaction of the free isocyanate group included therein with the reactive hydrogen atoms of the component B. In this case, the compound of the component B providing the reactive hydrogen atoms is preferably a primary or a secondary amine or a compound having free hydroxy groups. Furthermore, the reactive groups included in the component B are silane groups, preferably terminal silane groups which are bonded to a co-polymer, preferably a corresponding polyurethane. In this embodiment the component A can possibly contain an additional ingredient, e.g. a curing agent or an activator that is leading to a cross-linking of the component B due to the reaction of the silane groups with this ingredient or the reaction of one of the latent curing agents included in the component B with this ingredient of the component A.

The component A contains an ingredient having free isocyanate groups and which is preferably a polyurethane with terminal isocyanate groups linked to aliphatic or aromatic rests, and this component A furthermore, contains a specific compound (1), e.g. a catalyst (1), and component B contains an ingredient as well which has free isocyanate groups and is preferably a polyurethane with terminal isocyanate groups linked to aliphatic or aromatic rests and furthermore, a specific compound (2), e.g. a catalyst (2). In this case the specific compound (1) reacts at the contact of the component A with the component B with the specific compound (2) to yield a highly reactive ingredient which is causing the crosslinking of the ingredient of the component A having free isocyanate groups, and the ingredient of the component B having free isocyanate groups. If the specific compound (1) is a catalyst (1) and the specific compound (2) is a catalyst (2), then the catalyst (1) can for example react with catalyst (2) to yield a highly reactive trimersisation catalyst.

Also according to the embodiment illustrated hereafter, the component A as well as the component B contains an ingredient that has free isocyanate groups. According to this possibility, however, the free isocyanate groups included in the component A must have a lower reactivity than the free isocyanate groups contained in the component B, and the corresponding ingredient of the component A is preferably a polyurethane with terminal isocyanate groups linked to aliphatic rests, whereby the corresponding ingredient of the component B represents preferably a polyurethane with terminal isocyanates which are linked to aromatic rests. In this case, the component A must further contain a latent curing agent, e.g. an amidine, a ketimine or an oxazolidine, whereby this latent curing agent at the contact with a specific compound which is included in the component B, is activated and with this embodiment the component B must correspondingly further contain the specific compound which is necessary for the activation of the curing agent in the component A, in a way that at the contact of component A with the component B the component A is being cross-linked and furthermore, a cross-linking of the component A as well as of component B is taking place as soon as both components get in touch with water.

According to a further special embodiment the component A also contains an ingredient having free isocyanate groups, and preferably being a polyurethane with terminal isocyanates linked to aliphatic or aromatic rests, and component B contains epoxy groups as reactive groups, and it further contains hydroxy groups which are causing the cross-linking of the free isocyanate groups of the corresponding ingredient of the component A, whereby the component B is preferably an epoxy resin containing hydroxy groups. In this case, however, the component B must further contain a latent curing agent that is leading to a cross-linking of the ingredient that contains the epoxy groups as soon as this latent curing agent gets in touch with water. Furthermore, it is advantageous, if the component A further contains an accelerator or activator for the latent curing agent in component B for the cross-linking of the ingredient, containing the epoxy groups, in order to ensure a curing of the component A at the contact of the, component A with the component B, and possibly a curing of the component B through the accelerator included in the component A, and whereby at the contact of the component A and at the contact of the component B with water a curing of the component A as well as of the component B is taking place.

A preferred example of a latent curing agent that is leading to a cross-linking of the epoxy groups as soon as this latent curing agent gets in touch with water, is an aldimine, a ketimine or an oxazolidine. These latent curing agents are also being activated through the accelerator which can, possibly, further be included in the component A.

In the possibility described in the following, the component B contains an ingredient having epoxy groups as reactive groups and further a latent curing agent that is leading to a cross-linking of the ingredient containing the epoxy groups as soon as it gets in touch with water, and also in this case the latent curing agent in component B is preferably an aldimine, a ketimine or an oxazolidine. With this possibility, however, the component A contains an ingredient having silane groups as reactive groups, and the component A contains, possibly, furthermore, an ingredient which acts as an acclerator for the latent curing agent that is included in the component B, whereby this acclerator can be for example a compound that contains amino groups and/or hydroxy groups in its molecule. Also with this possibility of the two-component adhesive-, sealing- or coating composition according to the invention, at the contact of the component A with the component B, a curing of the component A takes place and possibly also a curing of the component B through the activator included in the component A for the latent curing agent in the component B. At the contact with water a curing of the component A as well as a curing of the component B is taking place, because the water also in this case liberates from the latent curing agent in component B the corresponding curing agent in component B for the reactive epoxy groups of component B.

In the same way as in the above described possibility, the following combination of component A and component B is eventually made-up, however, in this case the component A is the one that contains an ingredient having epoxy groups as reactive groups, and this component A must furthermore, contain a latent curing agent that is leading to a cross-linking of the ingredient containing the epoxy groups as soon as this latent curing agent gets in touch with water or with an activator or acclerator, for the latent curing agent included in the component A, contained in the component B. In this case the component B contains an ingredient that carries silane groups as reactive groups and furthermore, the activator or accelerator for the latent curing agent included in component A In this case the curing of the component A also takes place at the contact of the component A with the component B, and at the contact with water a curing of the component A as well as a curing of component B is taking place.

The two-component adhesive-, sealing- or coating compositions composed of components A and B can contain further ingredients, and also the two-component adhesive-, sealing- or coating composition composed of the component A and a component C comprising a volatile ingredient can furthermore, contain additional ingredients through which the properties of the compositions are adjusted for use and/or the properties of the adhesion, sealing or coating produced with these compositions are adjusted to the requirements in a most advantageous way.

According to a preferred embodiment of the two-component adhesive-, sealing- or coating compositions according to the invention the component A and/or component D contains at least an ingredient which is selected from the group of materials comprising the following components:

binders, preferably polymers, plasticizers filling materials, preferably silicic acid derivatives, gypsum, talcum, metal powder, chalk, kaolin, or carbon black, as well as organic filling materials, e.g. polyvinylchloride, thixotropic agents, preferably bentones, silicic acid derivatives, precipitated chalks, polyvinylchloride, urea derivatives or acryl derivatives dye-stuffs and/or pigments, and further admixtures which are improving the properties of use, the storability of the separately packed components A and D or the durability of the cured adhesive-, sealing- or coating composition, particularly adhesion promoters, surface-active additive, e.g. emulsifiers, flame-retardants, UV-absorbants, stabilizers, like antioxidants, as well as fungististatic and/or bacteriostatic agents Those two-component adhesive-, sealing- or coating compositions in which the component A as well as the component D are flowable at room temperature are particularly easy to put in an applicable condition through simple mixing of both components. In this case it is advantageous if the component A and the component D have a comparable viscosity at room temperature.

If, however, one of both components has a high viscosity which makes the mixing with the second component difficult through a simple heating procedure one of both components or both components can be transformed in a flowable condition.

Furthermore, the present invention relates to the use of the two-component adhesive-, sealing- or coating compositions according to the invention which is characterized in that the component A is being mixed with the component D and this mixture is to be applied on the substrate to be glued, to be sealed or to be coated, or that first a layer of the component A and thereafter a layer of the component D is applied, or first of all a layer of component D and thereafter the component A are applied on the substrate, or in order to glue the surface of substrate 1 with the surface of substrate 2, on the surface of substrate 1, the component A and on tie surface of substrate 2 the component D are applied, and both substrate surfaces that are to be glued are brought in touch with each other.

The invention is being illustrated in the following by means of some special examples.

EXAMPLE 1

By means of this example a two-component adhesive-, sealing- or coating composition is being illustrated, in which the component A contains an ingredient which has free isocyanate groups, and the component B has an ingredient which provides the reactive hydrogen atoms which are necessary for the cross-linking of the corresponding isocyanate groups of the ingredient of component A, and the component B further contains an ingredient that carries silane groups as reactive groups which are leading to a cross-linking of the component B as soon as they get in touch with ambient water.

According to the embodiment of the two-component adhesive-, sealing- or coating composition illustrated in this example, the component A contains a polyurethane with terminal isocyanate groups linked to aliphatic or aromatic rests, and the component B contains as polymeric material, one that also contains primary and/or secondary amino groups and/or free hydroxy- and/or free mercapto groups, and further the terminal silane groups, necessary for the cross-linking, of the component B with the ambient water. In the embodiment described in the present example of the component B is comprising a polyurethane with terminal silane groups which furthermore, contains the free am no groups and/or hydroxy groups and/or mercapto groups, linked to the polyurethane frame work which are necessary for the cross-linking of the component A.

With the component A being stored at the exclusion of water and the separately packed component B being at the exclusion of water, both components show an excellent storability.

If the component A is being mixed with component B, a rapid curing of the component A takes place through the contact of the free isocyanate groups included therein with the primary or secondary amino groups and/or hydroxy- and/or mercapto groups that are included in component B.

On those areas on which the primary or secondary amino groups or hydroxy groups are only insufficiently present after the mixing,(inaccurate mixing ratio of the components A and B, or inhomogeneous mixing respectively,) however, a complete curing of the component A is also taking place at the contact of the free isocyanate groups with ambient water, e.g. atmospheric moisture.

Furthermore, a complete curing of component B takes place at the contact with water due to the reaction of the terminal silane groups thereof with ambient water, e.g. atmospheric moisture.

Since the component A as well as the component B is curing completely at the contact with ambient water, a complete curing of the component A and also of the component B is achieved in those areas with stoichiometrically unsatisfactory mixing ratios. Immediately after the mixing of the component A with the component B and the accomplishment of an adhesion with this mixture, a sufficient strength of the adhesive areas is forming rapidly (due to the reaction of the free isocyanate groups of the component A with the amino- or mercapto- or hydroxy groups that are included in component B) and therefore no further support is necessary.

A more rapid development of a more rapid strength build-up of the adhesive area, or the sealing, respectively, can be achieved by incorporating a further ingredient to the component A containing the free isocyanate groups which at the contact with the silane groups in the component B is leading to a cross-linking of the ingredient of component B containing the silane groups. As an example for such additional ingredients which could be included in the component A, specific catalysts are to be mentioned which are causing the cross-linking of the silane groups.

EXAMPLE 2

This example is illustrating the embodiment of the invention, in which the component A contains an ingredient having free isocyanate groups and furthermore, a specific compound (1), e.g. a catalyst (1), and the component B contains an ingredient having free isocyanate groups and furthermore, a specific compound (2), e.g. a catalyst (2).

In this case, at the mixing of the component A with the component B the specific compound (1) included in component A is reacting with the specific compound (2) included in the component B in order to form a highly reactive ingredient that is causing the cross-linking of the ingredient of component A having free isocyanate groups as well as the cross-linking of the ingredient of component B having free isocyanate groups.

The component A in this embodiment, illustrated in this example, is a polyurethane with terminal isocyanate groups linked to aliphatic or aromatic rests, and the component A is further containing a catalyst (1).

The component B is also a polyurethane with free terminal isocyanate groups linked to aliphatic or aromatic rests, and it further contains a catalyst (2).

At the mixing of the component A with the component B, the catalyst (1) is reacting with the catalyst (2) in order to form a highly reactive trimerisation catalyst which is causing the curing of the component A as well as of the component B.

The steady curing of the component A as well as the steady curing of the component B is taking place on the other side through the contact of the free isocyanate groups of the ingredient of the component A, and the free isocyanate groups of the ingredient of the component B with the ambient water, e.g. atmospheric moisture.

Thus, in the embodiment illustrated in this example a steady curing of the component A as well as of the component B through the contact with ambient water is also taking place on those areas of the adhesive compound, or the sealant, repectively, on which, due to an non-stoichiometric mixing ratio of the components A and B, an insufficient quantity of the highly reactive trimerisation catalyst from the catalysts 1 and 2 is being formed.

In the present case the catalyst (1) was an ammonium derivative, and the catalyst (2) was a derivative containing epoxy groups, and at the contact of this catalyst (1) with the catalyst (2) a trimerisation catalyst turns up for the free isocyanate groups of the component A and the free isocyanate groups of the component B.

EXAMPLE 3

Through this example, such a two-component adhesive-, sealing- or coating composition is being illustrated, in which the component A as well as the component B contains an ingredient having free isocyanate groups, whereby the free isocyanate groups included in component A have a lower reactivity than the free isocyanate groups included in component B.

With this embodiment, the component A must further contain a latent curing agent, e.g. an aldimine, a ketimine or an oxazolidine, and the component B must further contain a specific compound that is activating the latent curing agent at the contact of the component A with the component B which is leading to the cross-linking of component A through reaction with the free isocyanate groups thereof.

In the present embodiment, the component A contains a polyurethane with terminal isocyanate groups linked to aliphatic rests, and the component B is equally a polyurethane, however, with terminal isocyanate groups linked to aromatic rests. The isocyanate groups of the component B linked to aromatic rests have a higher reactivity than the isocyanate groups of the component A linked to aliphatic rests.

At the mixing of the component A with the component B, the latent curing agent in component A is being activated, and thus, a rapid curing of the component A is taking place.

At the contact of the component A with ambient water and at the contact of the component B with ambient water, e.g the atmospheric moisture, furthermore, a complete curing of the component A as well as a complete curing of the component B takes place due to the free isocyanate groups included in these components.

Thus, a complete curing of the component A of the two-component adhesive-, sealing- or coating composition described herein, is taking place also on those areas, at which an insufficient quantity of the specific compound in the component B is included, and as a result no complete liberation of the curing agent from the latent curing agent is taking place.

In the present case, an isophorone-dialdimine was used as latent curing agent in the component A, and the specific compound contained in component B to liberate the amine from the latent curing agent of the component A was a very reactive isocyanate compound.

EXAMPLE 4

The present example is illustrating the embodiment of the two-component adhesive-, sealing- or coating composition according to the invention, in which the component A contains an ingredient having free isocyanate groups, and the component B contains an ingredient having reactive epoxy groups and whereby the component B is further containing free hydroxy groups which at the contact of the component A with the component B are leading to a rapid curing of the component A due to the contact of the free isocyanate groups with the hydroxy groups of the component B.

In the embodiment described herein, the component A was a polyurethane resin with free isocyanate groups, and the component B was a system of epoxy resin containing free hydroxy groups.

In the embodiment illustrated in this example, the component B further contained a latent curing agent for the free epoxy groups included in this component, and the component A further contained an accelerator or an activator for the latent curing agent included in the component B for the cross-linking of the ingredients of the component B containing the epoxy groups.

Thus, a rapid curing of the component A as well as a rapid curing of the component B was taking place during the mixing of the component A with the component B.

At those areas of the adhesion or coating thus, obtained, on which the mixing ratio of the accelerator or activator included in component A and the curing agent contained in component B or the mixing ratio of the isocyanate groups of the component A with the free hydroxyl groups included in the component B, respectively, did not correspond to the ideal stoichiometric ratio, a complete cross-linking of the component A as well as of the component B took place anyway due to the reaction of the free isocyanate groups of the component A with the ambient water and due to the liberation of the curing agent in the component B, through the contact of the latent curing agent with water and the curing of the epoxy groups through the liberated curing agent.

In the present example, the latent curing agent in component B was an isophorone dialdimine derivative, and the activator or acclerator, respectively, included in component A for this latent curing agent of the component B was a long chain aliphatic carboxylic acid.

According to a further embodiment of the present example 4, the component B contained reactive epoxy groups and further a trimerisation catalyst for the free isocyanate groups included in the component A.

EXAMPLE 5

In the present example, the component A contained an ingredient which has epoxy groups as reactive groups, and further a latent curing agent for the cross-linking of the epoxy groups of this ingredient of component A, carrying epoxy groups, preferably an aldimine, a ketimine or an oxazolidine.

In the present example, the component B contained a compound with terminal reactive silane groups and further an ingredient with primary or secondary amino groups or free mercapto groups.

At the contact of the component B with the component A a rapid cross-linking of the ingredient of component A having reactive epoxy groups is taking place through activation of the latent curing agent included in the component A, or through a reaction of the primary or secondary amino groups, respectively, or mercapto groups respectively which are included in the component B, with the latent curing agent included in the component A for the epoxy groups.

Furthermore, a complete curing of the component A due to the activation of the latent curing agent, for example a liberation of the curing agent from the latent curing agent which is included in the component A, is taking place in the embodiment I of the example 5 at those areas, on which the mixing ratio of the component A is diverging from the ideal stoichiometric mixing ratio. This activation is taking place through the ambient water, for example the atmospheric moisture.

Furthermore, a complete curing of the component B also takes place through the reaction of the terminal silane groups included in the component B with the ambient water.

With the above described possibility I of example 5, the component A contained an epoxy resin which, possibly, further to the free epoxy groups, contained hydroxy groups.

According to a possibility II of the present example 5, the component A contained as further ingredient a component which at the contact with the component B was leading to a rapid curing of the free silane groups included in component B.

With this possibility II of the present example 5, also a rapid curing of the component B was taking place at the contact of it with the component A.

As an example for the ingredients included in the component A which are leading to a rapid curing of the silane groups included in the component B, specific catalysts are to be mentioned which are causing a crosslinking of the silane groups.

EXAMPLE 6

By means of this example a two-component adhesive-, sealing- or coating composition is being described, in which the component A contains an ingredient which has epoxy groups as reactive groups and further an anhydride and, possibly, further a latent curing agent for the epoxy group included in the component A.

The component B contained an ingredient which carried silane groups as reactive groups and further a component that is leading to the liberation of the acid at the contact with the anhydride included in component A and, if necessary, also an activator or an accelerator which is leading to the liberation of the curing agent from the latent curing agent for the epoxy groups which is possibly further included in component A.

With this embodiment, the ingredient with the free epoxy groups included in the component A was a resin with reactive epoxy groups which, however, must be free of hydroxy groups. Epoxy resins with free hydroxy groups are in this present embodiment not storable, because the hydroxy groups react with the anhydride included in component A and thus, a steady curing would take place through the liberation of the acid from the anhydride.

At the contact of the component A with the component B a rapid curing of the component A is taking place due to the liberation of the acid from the anhydride included in the component A, or due to the possible liberation of the latent curing agent included in component A through the acid, respectively, or possibly through a further ingredient included in the component B, respectively.

Furthermore, a steady curing of the component A is taking place through the contact with the ambient water which is liberating the corresponding acid from the anhydride and therefore is leading to a cross-linking of the component A at those areas of the coating or sealing made by this composition on which the mixing ratio of the component A with the component B is deviating from the ideal stoichiometric proportions.

The component B is steadily curing to completion with the ambient water as well, due to the reaction of the free silyl groups at the contact with the ambient water.

EXAMPLE 7

By means of this example, a two-component adhesive-, sealing- or coating composition is being described, in which the component A contains an ingredient that is leading to a cross-linking of the component A as soon as these reactive groups get in touch with water, and the component C is a mixture which contains a solid, mixed with a volatile ingredient that at the contact with the reactive groups of the, at least one, ingredient of the component A. Is leading to a curing of the component A. Water is to be mentioned as a typical example for a volatile ingredient of the component C that is leading to a curing of the reactive groups of the component A.

In the embodiment of the present example, the component A was a polyurethane resin with free isocyanate groups which are predominantly linked to aromatic rests. The component A did not contain a latent curing agent for the free isocyanate groups.

The component C was a pasty mixture of a water dilutable polymer with ionic groups and water.

It was found that a polyurethane resin with at least one sulfonic acid group and/or carboxylic acid group is particularly suitable as water dilutable polymer of the component C, and in general furthermore, a plasticizer for a polyurethane resin was incorporated in this component C. Thereby, it was found that from the numerous commercially available plasticizers, those are particularly suitable that do not belong to the group of ester plasticizers.

Through the use of a static mixer a non-homogeneous mixture of the component A with the component C was produced. Despite the inhomogeneity of the mixture an immediate cross-linking of the isocyanate groups of the component A was taking place on those surfaces that have been in touch with the component C, and within about an hour an almost complete cross-linking of the isocyanate groups of the component A was achieved through diffusion of the water in the mixture.

With the use of equal equivalents of the component A and the component C (which makes sure that in the mixture of the component A and the component C about half of the molar quantity of water is available per equivalent of free isocyanate groups), despite the in-homogeneous mixture, a complete curing of the composition was achieved in a short time Even at the application of layers of a thickness of several millimeters between plates of material that is impermeable to air, a curing of the composition in a time of less than 10 minutes takes place.

After a storage of two days the lap shear strength of the adhesive area is being tested which was produced through the use of equal equivalents of the component A and the component C, as well as through surplus equivalents of the component A over the component C, or deficient equivalents of the component A over the component C. The adhesive area which was produced for test purposes through the use of the surplus or the deficiency of the component A, was found to have about the same lap shear strength as the adhesive area with equal equivalents of the components A and C.

Thus, it was found that deviations from the ideal mixing ratio, were entailing no or only a low diminution of the strength of the adhesive area In this example, the determination of the lap shear strength of the adhesive area was carried out according to the method that is illustrated in detail in the following example 8 with regard to the test of the adhesive compositions according to example 1.

EXAMPLE 8

By means of this example the lap shear strength of the adhesion which was realized by mixing the component A with the component B of the adhesive composition according to example 1, was tested.

Through the addition of filling materials, the component A as well as the component B was formulated in a way that with mixing of one part by volume of the component A with one part by volume of the component B, a complete cross-linking of the isocyanate groups of the component A and a complete consumption of the free amino groups of the component B is being achieved through the free isocyanate groups included in the component A and the free amino groups included in the component B that is, the amino groups of the polyurethane resin having terminal silane groups in which furthermore, at least two free amino groups were linked to each polymer molecule.

The lap shear strength of the adhesive areas have been measured according to the method of DIN 54451, and it is being presented in MPa.

With homogeneous mixing of one part by volume of the component A with one part by volume of the component B a final lap shear strength of 1.3 MPa was achieved. This final lap shear strength was already achieved after two hours after the mixing of the component A with the component B.

In a further test, the same component A was homogeneously mixed with the same component B, however, in this case one part by volume of the component A was mixed with two parts by volume of the component B.

With this mixing ratio, the final lap shear strength was lower to a minor extent. It was amounting to 1.2 MPa., however, this value of the final lap shear strength was only achieved after five hours. This is not surprising, because through the surplus of the component B the immediate curing of the isocyanate groups of the component A was achieved, the free silane groups included in component B, however, were leading to a complete curing of the component B only at the contact with a sufficient quantity of atmospheric moisture.

In a further test, a mixture of the same components A and B is again being produced, however, this time two parts by volume of component A were mixed with one part by volume of the component B.

In this case, the final lap shear strength was amounting again to 1.2 MPa, however, this value was only achieved after eight hours. This result can be explained by the fact that due to the deficiency of the component B in the mixture of the component A and B, not enough free amino groups were present to achieve an immediate curing of all isocyanate groups of the component A. Thus, the not reacted free isocyanate groups of the component A and the free silane groups of the component B had to be cured to completion through the atmospheric moisture.

For comparison purposes, the adhesion was carried out only with the component A (without addition of the component B), and in a further comparison test the adhesion was carried out only with the component B (without addition of the component A).

This is possible because the component A as well as the component B represent a one-component adhesion composition which is curing at the sole contact with ambient moisture.

At the exclusive use of the component A, the produced adhesive area showed a final value of stretch strength of 1.1 Mba, and at the exclusive use of the component B, the adhesive area showed a final stretch strength of 1.0 MPa.

With the exclusive use of the component A, the final stretch strength was only achieved after eight days after application, and with the exclusive use of the component B, the final stretch strength was only achieved after seven days.

We claim:

1. A two-component adhesive-, sealing- or coating-composition free of solid components having an ion exchanging effect, comprising separately packed components A and B in unmixed form, wherein component A and component B are curable upon contact with water or ambient moisture, wherein component A and component B are curable with each other, and wherein component A comprises at least a first compound having reactive groups selected from isocyanate groups, capped isocyanate groups, silane groups, anhydride groups, epoxy groups or combinations thereof, said reactive groups leading to cross-linking of component A upon contact with at least one ingredient of component B and/or water; and wherein component B comprises an ingredient which causes cross-linking of component A, and at least a second compound having reactive groups selected from isocyanate groups, capped isocyanate groups, silane groups, anhydride groups, epoxy groups or combinations thereof, said reactive groups leading to cross-linking of component B upon contact with water or an ingredient of component A.

2. The two-component composition according to claim 1, wherein the first compound having reactive groups causes cross-linking of component A upon contact with water, or the first compound having reactive groups causes cross-linking of component A upon contact with a curing agent which is liberated from a latent curing agent in component A upon contact with water, and the second compound having reactive groups causes cross-linking of component B upon contact with water, or the second compound having reactive groups leads to cross-linking of component B upon contact with a curing agent which is liberated from a latent curing agent in component B upon contact with water.

3. The two-component composition according to claim 2, wherein component A and component B are both capable of being cross-linked upon contact with ambient moisture.

4. The two-component composition according to claim 1, wherein the ingredient of component B which causes cross-linking of component A is a curing agent, a latent curing agent for the reactive groups of said first compound, or an activator of a latent curing agent in component A, and component A optionally comprises a curing agent or latent curing agent for the reactive groups of said second compound, or an activator of a latent curing agent in component B which causes cross-linking of component B.

5. The two-component composition according to claim 1, comprising a catalyst which causes cross-linking or self-cross-linking of said first compound and said second compound.

6. The two-component composition according to claim 1, wherein said first compound is a polyurethane with terminal isocyanates linked to an aliphatic or aromatic skeleton, said second compound is a polyurethane with terminal reactive silane groups, and component B comprises a compound with reactive hydrogen atoms selected from a primary amine, a secondary amine or a compound having free hydroxy groups, said compound with reactive hydrogen groups causing cross-linking of component A by reaction with the terminal isocyanate groups of said first compound polyurethane, and component A optionally comprises a curing agent or an activator which causes cross-linking of component B by reacting with the silane groups of said second compound polyurethane.

7. The two-component composition according to claim 1, wherein said first compound is a polyurethane with terminal isocyanate groups linked to an aliphatic skeleton, said second compound is a polyurethane with terminal isocyanate groups linked to an aromatic skeleton, the isocyanate groups of said first compound polyurethane having a lower reactivity than the isocyanate groups of said second compound polyurethane, component A comprises an aldimine, ketimine or oxazolidine latent curing agent, and component B comprises a compound which activates said latent curing agent, such that component A cures upon contact with component B, and that component A and component B cure upon contact with water.

8. The two-component composition according to claim 1, wherein said first compound is a polyurethane with terminal isocyanates linked to an aliphatic or aromatic skeleton, said second compound is an epoxy resin containing reactive epoxy groups and hydroxy groups, said reactive epoxy and hydroxy groups of said second compound causing the cross-linking of the isocyanate groups of said first compound, component B comprises an aldimine, ketimine or oxazolidine latent curing agent which, upon contact with water, causes cross-linking of said second compound epoxy resin, and component A optionally comprises an activator for said latent curing agent, such that component A cures upon contact with component B, with component B optionally curing, and that component A and component B cure upon contact with water.

9. The two-component composition according to claim 1, wherein said first compound has reactive silane groups, said second compound has reactive epoxy groups, component B comprises an aldimine, ketimine or oxazolidine latent curing agent which, upon contact with water, causes cross-linking of said second compound having reactive epoxy groups, component B further comprises a curing agent which causes cross-linking of said first compound having reactive silane groups, and component A optionally comprises an amino group- and/or hydroxy group-containing activator for said latent curing agent, such that component A cures upon contact with component B, with component B optionally curing, and that component A and component B cure upon contact with water.

10. The two-component composition according to claim 1, wherein said first compound has reactive epoxy groups, component A comprises an aldimine, ketimine or oxazolidine latent curing agent which, upon contact with water or an activator in component B, causes curing of said first component having reactive epoxy groups, said second compound has reactive silane groups, and component B comprises an activator for said latent curing agent, such that component A cures upon contact with component B, and that component A and component B cure upon contact with water.

11. The two-component composition according to claim 1, wherein component A and/or component B comprises an ingredient selected from binders, plasticizers, filling materials, thixotropic agents, dye-stuffs, pigments, adhesion agents, surface active agents, flame retarders, UV-absorbants, screening agents, stabilizers, fungistatic agents or bacteriostatic agents.

12. The two-component composition according to claim 1, wherein component A and component B are flowable at room temperature.

* * * * *